United States Patent [19]
White

[11] Patent Number: 5,823,546
[45] Date of Patent: Oct. 20, 1998

[54] TOBOGGAN

[76] Inventor: Adrian Christopher White, 79 Clifton Rd. Ruddington, Nottingham NG11 6DA, England

[21] Appl. No.: 541,891

[22] Filed: Oct. 10, 1995

Related U.S. Application Data

[63] Continuation-in-part of Ser. No. 307,855, Sep. 30, 1994, abandoned.

[30] Foreign Application Priority Data

| Apr. 2, 1992 | [GB] | United Kingdom | 9207245 |
| Mar. 29, 1993 | [WO] | WIPO | PCT/GB93/00638 |

[51] Int. Cl.$^6$ ........................... B62B 9/04
[52] U.S. Cl. ............................. 280/22.1; 280/16
[58] Field of Search ................. 280/16, 17, 20, 280/22.1, 22, 14.1; 297/DIG. 2, 337, 440.22; D12/6, 9, 10, 11

[56] References Cited

U.S. PATENT DOCUMENTS

| 2,323,847 | 7/1943 | Sampsell . |
| 3,190,671 | 6/1965 | Fabris . |
| 3,326,569 | 6/1967 | Leeming . |
| 3,329,440 | 7/1967 | Tonelli . |
| 3,629,041 | 12/1971 | Shobert .................................. 280/18 |
| 3,840,083 | 10/1974 | Woods .................................... 180/190 |
| 4,219,207 | 8/1980 | Muir et al. . |
| 4,324,409 | 4/1982 | Larsen et al. ........................ 280/28.11 |
| 4,987,282 | 1/1991 | Chastain ................................ 280/608 |

FOREIGN PATENT DOCUMENTS

| 2187370 | 1/1974 | France . |
| 181700 | 2/1907 | Germany . |
| 195987 | 2/1908 | Germany . |
| 746677 | 8/1944 | Germany . |
| 3444428 | 8/1985 | Germany . |
| 3701252 | 7/1988 | Germany . |
| 105415 | 9/1942 | Sweden . |
| 447833 | 3/1968 | Switzerland . |
| 1529 | 3/1897 | United Kingdom . |

*Primary Examiner*—Brian L. Johnson
*Assistant Examiner*—Avraham Lerner
*Attorney, Agent, or Firm*—Young & Basile, P.C.

[57] ABSTRACT

A highly manoeuvrable toboggan (50) comprises a pair of ski members (60) connected only by a flexible and resilient plastic seat (70). The seat (70) is sufficiently flexible to enable the ski members (60) to be moved independently, relative to one another. In use, a rider sits on the seat (70) and is able to manoeuvre the toboggan (50) by application of force to the ski members (60) using his legs and hands and/or by shifting his weight on the seat (70). Manoeuvres similar to those executed in downhill skiing may be performed.

27 Claims, 4 Drawing Sheets

TOBOGGAN

This application is a continuation-in-part of application Ser. No. 08/307,855 filed Sep. 30, 1994 and now abandoned.

FIELD OF THE INVENTION

This invention relates to a toboggan, and in particular to a manoeuvrable toboggan having runners which are movable relative to one another.

BACKGROUND OF THE INVENTION

Conventionally, toboggans or sledges comprise two runners connected to a rigid body upon which a person may sit or lie. The runners are fixed relative to one another, and each have a lower surface which can slide over snow, ice or other suitable surfaces.

A problem with known sledges is the inherent lack of manoeuvrability, and difficulty of changing direction of travel.

Numerous attempts have been made to devise manoeuvrable sledges or toboggans. Examples of such sledges are described in, in chronological order, British Patent 1529 (Kiefel), German Patent 181700 (Hauenstein), German Patent 195987 (Schultheisz), German Patent 746677 (Klima), U.S. Pat. No. 2,323,847 (Sampsell), U.S. Pat. No. 3,190,671 (Fabris), U.S. Pat. No. 3,329,440 (Tonelli), Swiss Patent 447833 (Schrall), U.S. Pat. No. 3,326,569 (Leeming), U.S. Pat. No. 4,219,207 (Muir), German Patent Application 3444428 (Peter) and German Patent Application 3701252 (Federhen).

All of such known sledges suffer from the disadvantages that they are mechanically very complex and/or are of limited manoeuvrability and/or are difficult to operate.

SUMMARY OF THE INVENTION

It is an object of the present invention to provide an improved toboggan.

It is a further object of the invention to provide a highly manoeuvrable toboggan which is of mechanically simple construction.

Another object of the invention is to provide a toboggan which is easy to manoeuvre simply by the application of force to the runners through the rider's legs or hands, and/or by shifting of the rider's weight.

A yet further object of the invention is to provide a toboggan which can be manoeuvred in a manner similar to the manoeuvres executed in downhill skiing.

A further object of the invention is to provide a toboggan which is light in weight, compact and readily transportable.

A further object of the invention is to provide a toboggan which is readily adjustable to suit different riders.

These and other objects of the invention are achieved in a toboggan comprising a pair of first and second elongate ski members laterally coupled together by a resilient coupling member. The coupling member is of sufficient flexibility that it permits relative movement of the ski members.

The toboggan according to the invention is advantageous primarily in that the relative movement which is possible between the ski members enables the toboggan to be manoeuvred more easily than is the case with conventional sledges or toboggans. The ski members are connected by the resilient coupling member at only one point. There are no rigid members connecting the pair of ski members, and the toboggan may be controlled simply by the user applying forces directly to the ski members and/or shifting his body weight, using skills similar to those used in skiing. The ski members may be moved largely independently of each other, and the orientations of their longitudinal axes may be changed independently, enabling a wide variety of manoeuvres to be executed, such as snow-plough and parallel turns, as well as braking and accelerating.

DETAILED DESCRIPTION OF THE INVENTION

Preferably, the resilient coupling member comprises a moulded member of plastics material. Most conveniently, the coupling member functions also as a seat for the rider of the toboggan.

The coupling member may be releasably secured to the first and second ski members, eg by means of bolts. Most preferably, the coupling member is moulded about the heads of the bolts. The coupling member is most preferably of an elastomeric material.

Locating holes are provided in the ski members, through which the bolts are passed and secured by means of nuts threadedly engaged with the bolts. It is particularly preferred that a series of two or more, eg three, locating holes are provided in each ski member to enable the coupling member to be positioned in any one of several positions. This enables the position of the seat to be adjusted simply and easily to suit taller or shorter riders. This is especially important as it enables optimum adjustment, and hence greater ease of use and greater manoeuvrability.

Preferably, the forward ends of the ski members are upturned to facilitate running of the toboggan over the ground. Preferably also, the forward ends of the ski members are provided with toe straps or other means for gripping the rider's feet to facilitate control of the toboggan.

Each of the first and second ski members preferably comprises a runner having a substantially flat ground-contacting undersurface. Most preferably, each ski member further comprises a rail which is upwardly spaced from, and substantially parallel to, the runner such that the rider may grip the rail with his hands to facilitate the application of force by the rider to the ski member.

Preferably, the rail and the runner are formed integrally, the rail and the runner being joined towards their rear ends by an upstanding post. Most preferably, the ski member assembly of runner, rail and post is integrally formed, eg integrally moulded from plastics material. The assembly may be of composite construction, comprising a spine or core of high-strength rigid plastics material about which a second plastics material is moulded in a second operation.

The forward end of the rail may be joined integrally to the runner. Alternatively, and preferably, the forward end of the rail may be fixed, eg bolted, to the ski member, eg via an intermediate rigid component. In a further alternative, shock-absorbing means is interposed between the runner and the forward end of the rail. Such means may take the form of an elastomeric body, and may serve to reduce the transmission of vibrations from the runner to the rail.

In constructions of the type described above, the locating holes for the coupling member are preferably provided in the rail.

The upper surface of the runner may be provided with a footpad, eg of a rubber material, for better grip between the rider's foot and the runner.

The ground-contacting undersurface of the ski member may be provided with a metal strip, eg of steel, for increased durability and reduction of friction.

DETAILED DESCRIPTION OF PREFERRED EMBODIMENTS

Figure 1:
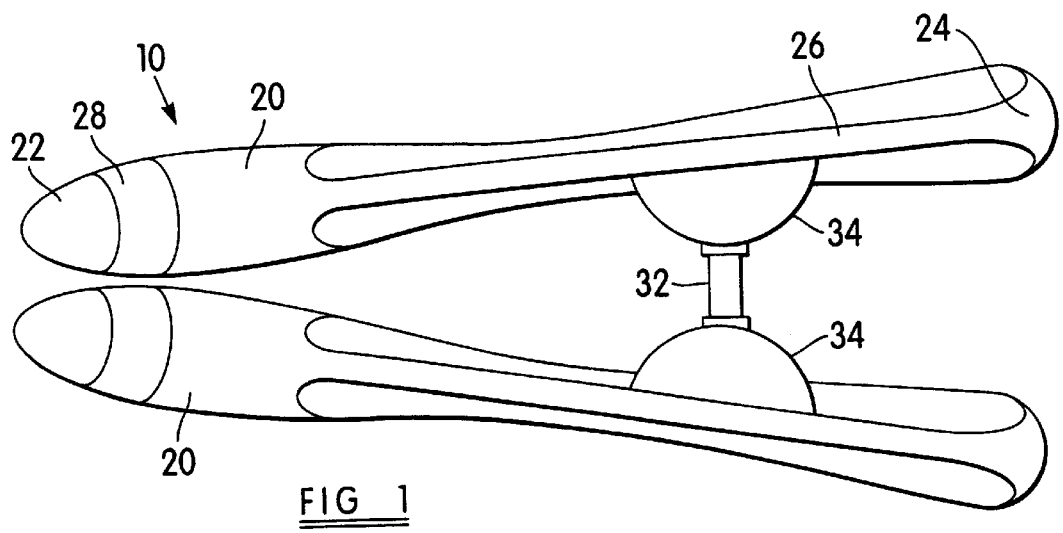
FIG. 1 shows a plan view of a first embodiment of a toboggan according to the present invention.
Figure 2:
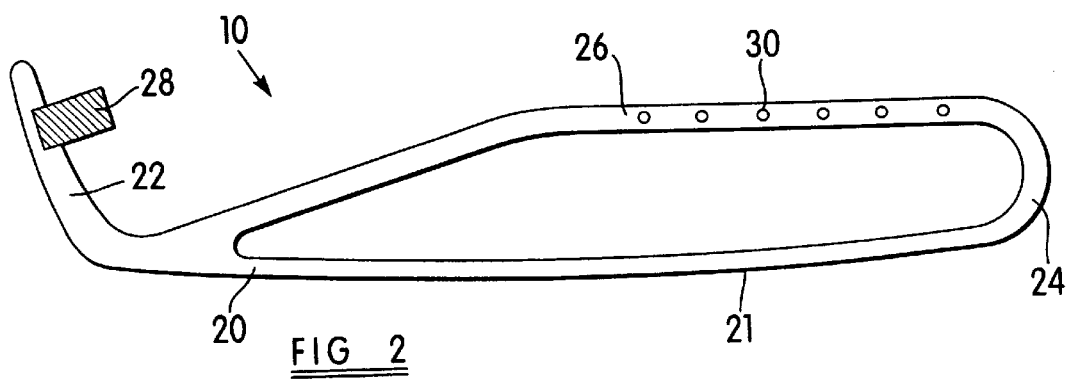
FIG. 2 shows a side view of the toboggan of FIG. 1.

Referring first to FIGS. 1 and 2, there is shown a toboggan 10 according to a first embodiment of the present invention, comprising two ski members 20 (or "runners") each having a lower surface 21 for contact with the ground, a forward end 22 including a raised toe, a rearward end 24 or heel, and a support rail 26. A toe strap 28, or similar means for gripping the foot of a rider of the toboggan 10 is provided towards the forward end 22 of the ski member 20. The ski members 20 may constructed of any suitable rigid material or combination thereof, such as wood, metal, alloys or plastics.

The support rails 26 include a series of holes 30 suitable for the passing of bolts therethrough, in order to attach a connecting device 32,34 which, in the illustrated embodiment includes a link portion 32 and seat portions 34. The link portion 32 is a flexible and resilient bar of plastics material. The link portion 32 may alternatively be connected directly to each ski member 20, with seat portion(s) 34 provided separately.

The seat portions 34 are attached to the ski members 20 using bolts (not visible) passing through holes 30 in a known manner. The series of holes 30 allows multiple fixing points and allows adjustment of the position of the seat 34 and link portion 32 longitudinally on the ski members 20 to facilitate use of the toboggan 10 by persons of differing sizes.

The ski members 20 and seat portions 34 are preferably mutually detachable for portability of the toboggan 10.

The toboggan 10 may also be provided with separate "grab handles" for the rider of the toboggan, positioned appropriately such as on the top of the support rails 26.

Figure 3:
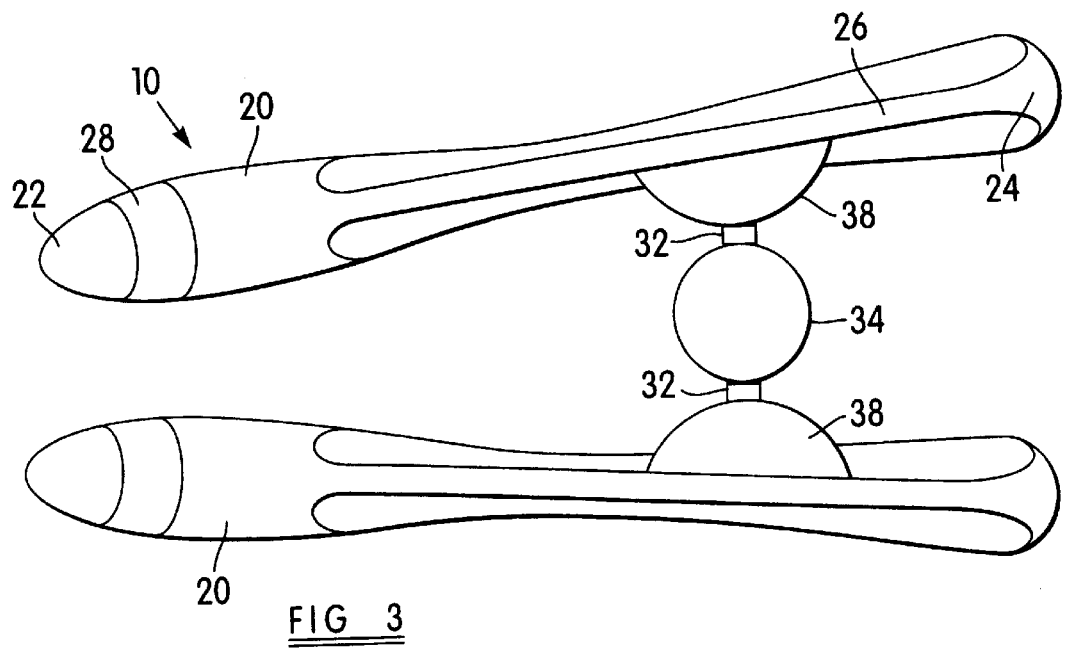
FIG. 3 shows a plan view of a second embodiment of a toboggan according to the present invention.

In the alternative embodiment shown in FIG. 3, there is shown a similar arrangement to that of FIGS. 1 and 2 in which a seat portion 34 is attached to the ski members 20 on each side by means of two link portions 32, and a mounting portion 38 which may be bolted to the ski members in similar fashion. Ski member 20 and mounting portion 38 may alternatively be integrally formed.

Figure 4:
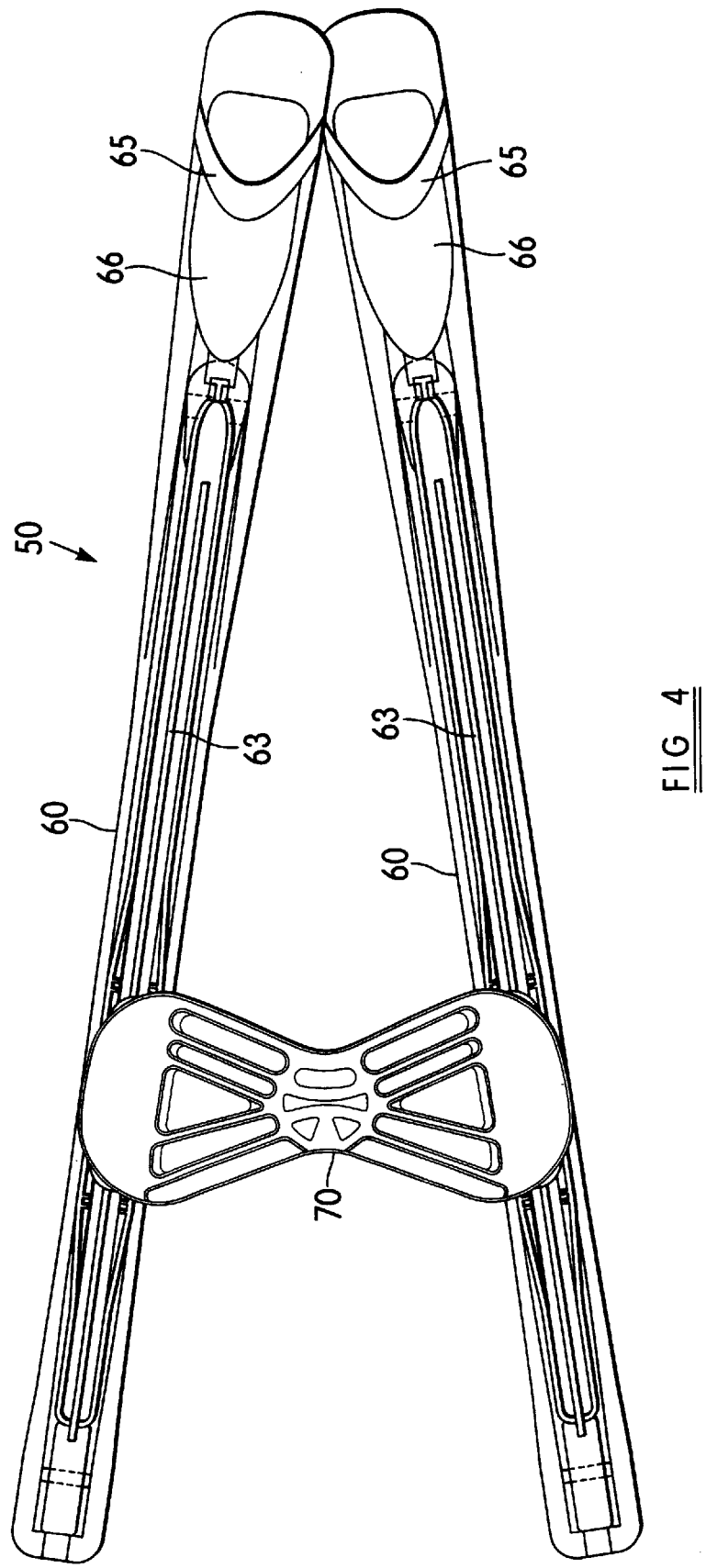
FIG. 4 shows a plan view of a further, presently most preferred, embodiment of a toboggan according to the present invention.
Figure 5:
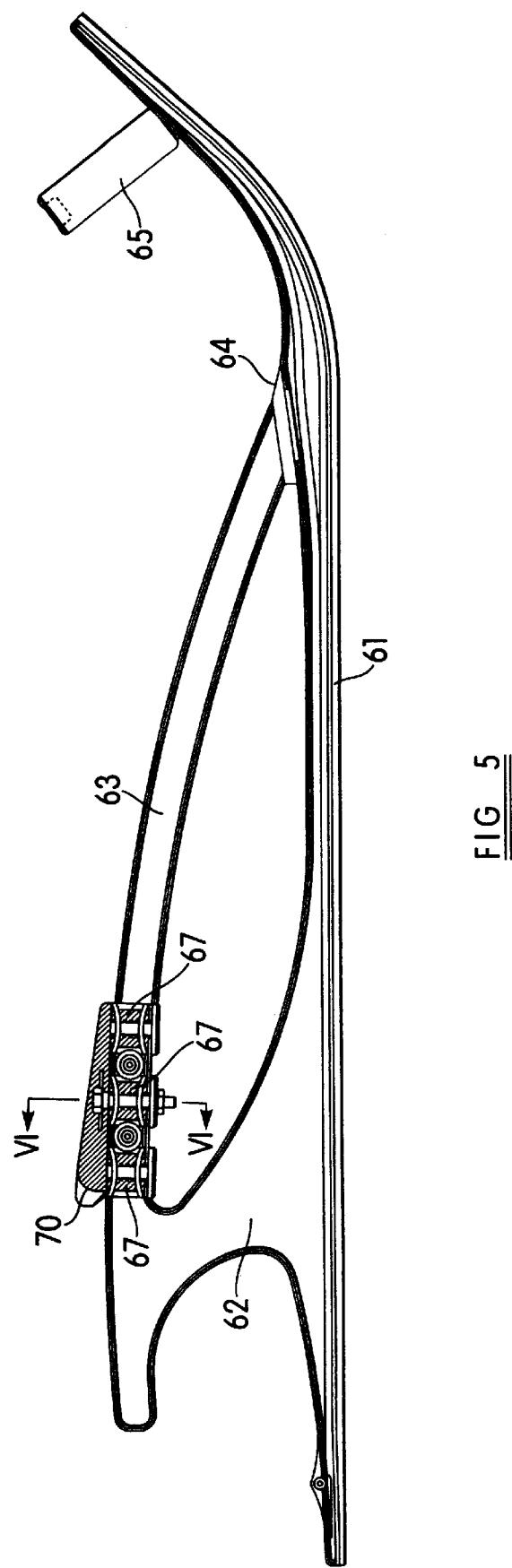
FIG. 5 shows a side view of the toboggan of FIG. 4, partly in section.
Figure 6:
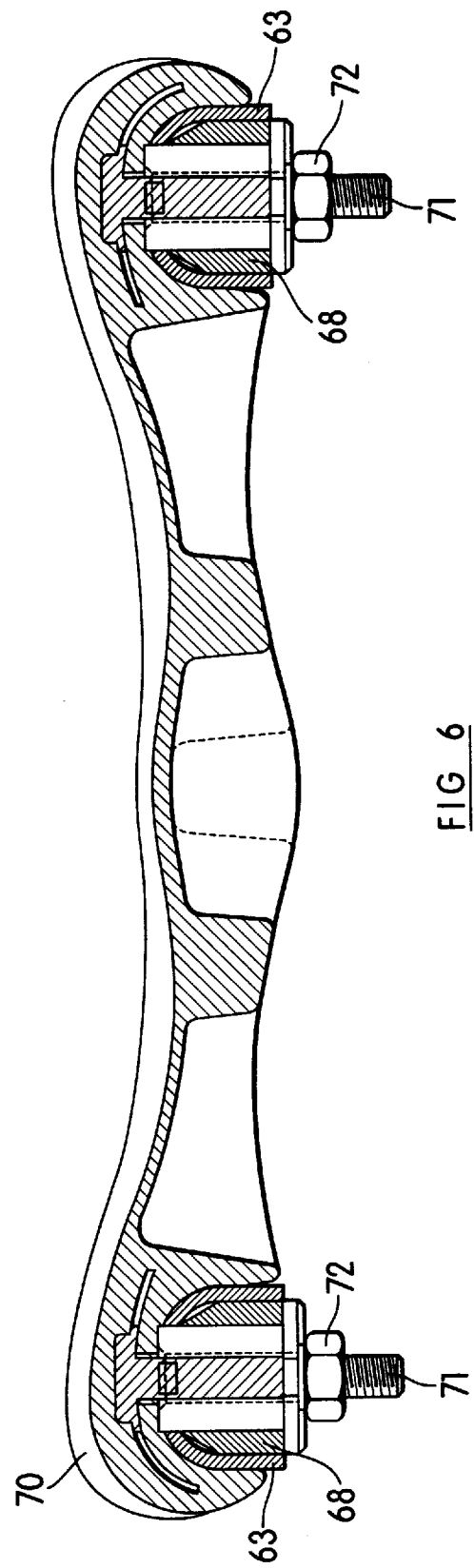
FIG. 6 is a sectional view along the line VI—VI in FIG. 5.

Turning now to the currently most preferred embodiment of the present invention, this is shown in FIGS. 4 to 6. Referring first to the plan view shown in FIG. 4, the toboggan (generally designated 50) comprises a pair of ski assemblies 60, connected by a seat 70 of moulded elastomeric plastic. Each ski assembly 60 comprises (see FIG. 5) a runner 61 having integrally moulded therewith an upstanding post 62 and a rail 63. The assembly of runner 61, post 62 and rail 63 is a composite moulding having a high-strength core or spine about which a second material is moulded. The forward end of the rail 63 is joined to the runner 61 via an aluminium casting 64 which is interposed between, and fixedly connected to, the runner 61 and the end of the rail 63. A toe strap 65 is fitted to the upturned forward or toe end of each runner 61 in a similar fashion to the toe straps 28 of the embodiment of FIGS. 1 and 2. Rubber footpads 66 are also adhesively mounted on the forward upper surfaces of the runners 61 to enhance the grip between the rider's feet and the runners 61. Steel strips (not shown) are fitted to the undersurfaces of the runners 61 to prevent damage to the runners 61 and to reduce friction between the runners 61 and the ground.

As can be seen in the sectioned portion of FIG. 5, three fixing holes 67 are provided in the rails 63, just forward of the post 62, for securing of the seat 70. Each of the holes 67 is fitted with a rigid plastics bushing 68 (see FIG. 6). The seat 70 is moulded about the heads of a pair of threaded bolts 71 such that the bolts 71 are held captive by the material of the seat 70, and the shanks of the bolts 71 depend downwardly from the seat 70. The bolts 71 are passed through selected bushings 68 and held in place by nuts 72. A tall rider would pass the bolts 71 through the rearmost holes 67, whilst a short rider would use the forwardmost holes 67. In FIGS. 4 and 5, the seat 70 is shown fitted to the middle holes 67. The position of the seat 70 may be quickly and easily adjusted by unscrewing the nuts 72 and relocating the bolts 71 in different holes 67.

The manner in which the toboggan according to the invention is used will now be described in relation to the most preferred embodiment of FIGS. 4 to 6. At the top of the slope down which the toboggan 50 is to be ridden, a rider sits astride the toboggan 50, sitting on the seat 70 and placing his feet on the footpads 66, under the toestraps 65. The rider grips the rails 63 and the toboggan will start to slide downhill. If necessary, the rider may push against the ground with his hands and/or feet to begin moving.

As can be seen in FIG. 4, in the unstressed condition, the ski members 60 are oriented such that they converge, the toe ends of the runners 61 touching or slightly overlapping. In this orientation, the toboggan 50 will travel (unless caused to deviate by the contours of the ground over which it is travelling) in a straight line. In the absence of any applied force, the resilience of the seat 70 will tend to maintain this orientation. However, using his legs, the rider may apply force to the ski assemblies 60 to move the runners 61 against the resilience of the seat 70 to a more parallel orientation. This will increase the speed of the toboggan 50. Similarly, by means of force applied through his legs and/or arms, and/or by appropriate shifting of his weight on the seat 70, the rider may move the ski members 60 independently, enabling him to perform manoeuvres such as snow-plough or parallel turns. If forces applied by the rider are relaxed, the resilience of the seat 70 tends to return the ski members 60 to the orientation shown in FIG. 4, whereupon the toboggan 50 would once again resume motion straight forward. The converging orientation of the ski members 60 in the relaxed condition also has a braking effect.

Simply by unscrewing the nuts 72, the seat 70 may be released from the ski members 60, thereby enabling the toboggan 10 to be readily dismantled for transportation and compact storage.

What is claimed is:

1. A toboggan comprising:
   first and second ski members; and
   a resilient coupling member connecting said first and second ski members at points intermediate the ends of said first and second ski members;
   said resilient coupling member being sufficiently flexible to permit movement of said first and second ski members relative to each other under the application of force to said first or second ski members by a rider of said toboggan;

wherein said resilient coupling member is releasably secured to the first and second ski members by means of bolts, about which said resilient coupling member is molded, said bolts passing through locating holes provided in said first and second ski members and secured by means of nuts threadedly engaged with said bolts.

2. A toboggan as claimed in claim 1, wherein said resilient coupling member comprises a molded member of plastics material.

3. A toboggan as claimed in claim 1, wherein said resilient coupling member functions also as a seat for a rider of the toboggan.

4. The toboggan as claimed in claim 1, wherein there are provided in each of said first and second ski members a plurality of locating holes through selected ones of which said bolts are passed and secured by means of nuts threadedly engaged with said bolts.

5. The toboggan as claimed in claim 1, wherein said locating holes are provided with bushes of resilient plastics material.

6. The toboggan as claimed in claim 1, wherein the ski members have forward ends that are upturned.

7. The toboggan as claimed in claim 1, wherein said ski members have forward ends and the forward ends of said ski members are provided with toe straps for gripping a rider's feet to facilitate control of the toboggan.

8. The toboggan as claimed in claim 1, wherein each of said first and second ski members comprises a runner having a substantially flat ground-contacting undersurface, and a rail which is upwardly spaced from, and substantially parallel to, said runner such that a rider may grip the rail with his hands to facilitate the application of force by the rider to said ski member.

9. The toboggan as claimed in claim 1, wherein each of said first and second ski members comprise a runner having a substantially flat ground-contacting undersurface, and a rail which is upwardly spaced from, and substantially parallel to, said runner, and wherein said rail and said runner are formed integrally, said rail and said runner being joined towards their rear ends by an upstanding post.

10. The toboggan as claimed in claim 9, wherein said runner, said rail and said post constitute an assembly which is integrally molded from plastics material, the assembly being of composite construction, comprising a spine or core of high-strength rigid plastics material about which a second plastics material is molded in a second operation.

11. The toboggan as claimed in claim 9, wherein said runner and a forward end of said rail are joined by an intermediate rigid component.

12. The toboggan as claimed in claim 9, wherein an aluminum casting is interposed between said runner and a forward end of said rail.

13. The toboggan as claimed in claim 1, wherein each of said first and second ski members is provided with a footpad of a rubber material.

14. The toboggan as claimed in claim 1 wherein said first and second ski members each have an undersurface and a metal strip is affixed to the undersurface of each of said first and second ski members.

15. A toboggan comprising:
first and second ski members; and
a resilient coupling member connecting said first and second ski members at points intermediate the ends of said first and second ski members;

said resilient coupling member being sufficiently flexible to permit movement of said first and second ski members relative to each other under the application of force to said first or second ski members by a rider of said toboggan;

wherein said resilient coupling member is releasably secured to the first and second ski members by means of bolts, about the heads of which said resilient coupling member is molded, and there are provided in each of said first and second ski members a plurality of locating holes through selected ones of which said bolts are passed and secured by means of nuts threadedly engaged with said bolts.

16. A toboggan comprising:
first and second ski members; and
a resilient coupling member connecting said first and second ski members at points intermediate the ends of said first and second ski members;

said resilient coupling member being sufficiently flexible to permit movement of said first and second ski members relative to each other under the application of force to said first or second ski members by a rider of said toboggan;

wherein said resilient coupling member is releasably secured to said first and second ski members by means of bolts, about the heads of which said resilient coupling member is molded, and there are provided in each of said first and second ski members a plurality of locating holes through selected ones of which said bolts are passed and secured by means of nuts threadedly engaged with said bolts, said locating holes being provided with bushes of resilient plastics material.

17. A toboggan comprising
first and second ski members, each of said first and second ski members comprising a runner having a substantially flat ground-contacting undersurface, and a rail which is upwardly spaced from, and substantially parallel to, said runner such that a rider may grip the rail with his hands to facilitate the application of force by the rider to said ski member, said rail being integrally formed with said runner; and
a resilient coupling member connecting said first and second ski members at points intermediate the ends of said first and second ski members, said resilient coupling member comprising a moulded member of plastics material and serving also as a seat for the rider of the toboggan;

wherein said resilient coupling member is releasably secured to said first and second ski members by means of bolts, about heads of which said resilient coupling member is moulded, said bolts passing through locating holes provided in said first and second ski members and being secured by means of nuts threadedly engaged with said bolts;

said resilient coupling member being sufficiently flexible to permit movement of said first and second ski members relative to each other under the application of force to said first or second ski members by the rider of said toboggan.

18. The toboggan as claimed in claim 17, wherein there are provided in each of said first and second ski members a plurality of locating holes through selected ones of which said bolts are passed.

19. The toboggan as claimed in claim 17, wherein said locating holes are provided with bushes of resilient plastics material.

20. The toboggan as claimed in claim 17, wherein said ski members have forward ends that are upturned.

21. The toboggan as claimed in claim 17, wherein said ski members have forward ends, said forward ends are provided with toe straps for gripping a rider's feet to facilitate control of the toboggan.

22. The toboggan as claimed in claim 17, wherein said rail and said runner are joined towards their rear ends by an upstanding post.

23. The toboggan as claimed in claim 22, wherein said runner, said rail and said post constitute an assembly which is integrally molded from plastics material, the assembly being of composite construction, comprising a spine or core of high-strength rigid plastics material about which a second plastics material is molded in a second operation.

24. The toboggan as claimed in claim 22, wherein said runner and a forward end of said rail are joined by an intermediate rigid component.

25. The toboggan as claimed in claim 22, wherein an aluminum casting is interposed between said runner and a forward end of said rail.

26. The toboggan as claimed in claim 17, wherein each of said first and second ski members is provided with a footpad of a rubber material.

27. The toboggan as claimed in claim 17, wherein said first and second ski members each have an undersurface and a metal strip is affixed to the undersurface of each of said first and second ski members.

\* \* \* \* \*